United States Patent
Peiffer et al.

(12)

(10) Patent No.: US 6,641,924 B1
(45) Date of Patent: Nov. 4, 2003

(54) WHITE, BIAXIALLY ORIENTED POLYESTER FILM WITH CYCLOOLEFIN COPOLYMER (COC), PROCESS FOR PRODUCING THE FILM, AND ITS USE

(75) Inventors: Herbert Peiffer, Mainz (DE); Gottfried Hilkert, Saulheim (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 09/421,068

(22) Filed: Oct. 19, 1999

(30) Foreign Application Priority Data

Jul. 14, 1999 (DE) .......................................... 199 32 384

(51) Int. Cl.⁷ .................... B32B 27/06; B32B 27/18; B32B 27/36; B32B 27/32
(52) U.S. Cl. .................... 428/480; 428/327; 428/304.4; 428/318.4; 428/910; 525/165; 525/173; 525/174; 525/176; 525/177; 526/281; 526/280; 526/283; 264/288.4; 264/290.2
(58) Field of Search .............................. 428/480, 304.4, 428/318.4, 327, 910; 525/165, 173, 174, 176, 177; 526/280, 281, 283; 264/288.4, 290.2

(56) References Cited

U.S. PATENT DOCUMENTS

| | | | |
|---|---|---|---|
| 3,515,626 A | 6/1970 | Duffield | |
| 3,563,942 A | 2/1971 | Heiberger et al. | |
| 3,779,993 A | 12/1973 | Kibler et al. | |
| 3,944,699 A | 3/1976 | Mathews et al. | |
| 3,958,064 A | 5/1976 | Brekken et al. | |
| 4,042,569 A | 8/1977 | Bell et al. | |
| 4,187,133 A | 2/1980 | Mathews et al. | |
| 4,252,885 A | 2/1981 | McGrail et al. | |
| 4,399,179 A | 8/1983 | Minami et al. | |
| 4,493,872 A | 1/1985 | Funderburk et al. | |
| 4,614,778 A | * 9/1986 | Kajiura et al. | 526/281 |
| 4,615,939 A | 10/1986 | Corsi et al. | |
| 4,622,237 A | 11/1986 | Lori | |
| 5,179,171 A | * 1/1993 | Minami et al. | 525/288 |
| 5,453,260 A | 9/1995 | Nakazawa et al. | |
| 5,468,527 A | 11/1995 | Peiffer et al. | |
| 5,506,014 A | 4/1996 | Minnick | |
| 5,843,578 A | 12/1998 | Sasaki et al. | |
| 5,869,586 A | * 2/1999 | Riedel et al. | 526/170 |
| 5,912,070 A | * 6/1999 | Miharu et al. | 428/214 |
| 6,326,431 B1 | * 12/2001 | Peiffer et al. | 525/177 |
| 2001/0029274 A1 | * 10/2001 | Murschall et al. | 524/93 |
| 2001/0031802 A1 | * 10/2001 | Murschall et al. | 524/1 |
| 2002/0033556 A1 | * 3/2002 | Rounsley | 264/288.8 |
| 2002/0115760 A1 | * 8/2002 | Murschall et al. | 524/128 |
| 2002/0160215 A1 | * 10/2002 | Peiffer et al. | 428/480 |

FOREIGN PATENT DOCUMENTS

| | | |
|---|---|---|
| DE | 1694404 | 4/1971 |
| DE | 2230970 | 2/1973 |
| DE | 2353347 | 5/1974 |
| DE | 3801535 | 7/1988 |
| DE | 4306155 | 9/1994 |
| DE | 19540277 | 5/1996 |
| EP | 0 035 835 | 9/1981 |
| EP | 0 061 769 | 10/1982 |
| EP | 0 088 635 | 9/1983 |
| EP | 0 124 291 | 11/1984 |
| EP | 0 515 096 | 11/1992 |
| EP | 0 522 758 | 1/1993 |
| EP | 0 580 404 | 1/1994 |
| EP | 0 602 964 | 6/1994 |
| EP | 0 604 057 | 6/1994 |
| EP | 0 609 060 | 8/1994 |
| EP | 0 612 790 | 8/1994 |
| EP | 0 659 810 | 6/1995 |
| EP | 0 663 286 | 7/1995 |
| EP | 0 685 509 | 12/1995 |
| EP | 0 707 979 | 4/1996 |
| EP | 0 786 495 | 7/1997 |
| EP | 0 795 399 | 9/1997 |
| EP | 0 800 914 | 10/1997 |
| EP | 0 826 478 | 3/1998 |
| EP | 0 878 298 | 11/1998 |
| JP | 05-009319 | * 1/1993 |
| JP | 05-140349 | * 6/1993 |
| JP | 05-230253 | * 9/1993 |
| WO | WO 94/13476 | 6/1994 |
| WO | WO 94/13481 | 6/1994 |
| WO | WO 98/13414 | 4/1998 |
| WO | WO 98/13415 | 4/1998 |
| WO | WO 88/10188 | 12/1998 |

OTHER PUBLICATIONS

Weiss, J., *Parameters that influence the barrier properties of metallized polyester and polypropylene films*, 204 Thin Solid Films 203–216 (1991).

Kimura, S.F. et al., *FTIR Spectroscopic Study on Crystallization Process of Poly (ethylene–2,6–naphthalate)*, 35 Journal of Polymer Science: Polymer Physics 2741–2747 (1997).

Bursch et al., "Biaxially Oriented Polyester Film for SMD Condensers—Made by Extrusion Followed by Biaxial Stretching and Heat Fixing to Give Specified Shrinkage Parameters in the Machine Direction and Transverse Direction." Derwent Abstract, WPI Acc. No. 98–194495/199818 (1998).

Database WPI, Section Ch, Week 9615, Derwent Publications Ltd., London, GB; Class A23, AN 96–148338, XP002114377 & JP 08 03679 A (Toray Indus., Inc.) (Feb. 6, 996).

(List continued on next page.)

*Primary Examiner*—Vivian Chen
(74) *Attorney, Agent, or Firm*—Finnegan, Henderson, Farabow, Garrett & Dunner, LLP

(57) ABSTRACT

The present invention relates to a white, biaxially oriented polyester film having at least a base layer, the characterizing features of which are that at least this base layer comprises a cycloolefin copolymer (COC) at a concentration of from 4 to 60% by weight, based on the base layer, where the glass transition temperature of cycloolefin copolymer (COC) is within the range from 70 to 270° C.

20 Claims, No Drawings

OTHER PUBLICATIONS

Database WPI, Section Ch, Week 9522, Derwent Publications Ltd., London, GB; Class A32, AN 95–166886, XP002114408 & JP 07 088592 A (Toray Indus., Inc.) (Apr. 4, 1995).

Database Chemabs, Chemical Abstracts Service, Kishida et al, "Lightweight Polyester Films and their Manufacture" from STN Database Accession No. 119:182564 XP002150969 (Jun. 8, 1993).

Database Chemabs, Chemical Abstracts Service, Yasue et al, "Lightweight Polyester Films for Paper Substitutes and their Manufacture" from STN Database Accession No. 119:74254 XP 002150970 (Jan. 19, 1993).

Database Chemabs, Chemical Abstracts Service, Kishida et al, "Lightweight Polyster Films and their Manufacture" from STN Database Accession No. 120:56400 XP002150971 (Sep. 7, 1993).

Database Chemabs, Chemical Abstracts Service, Sasaki et al, "Microporous Polyester Films as Paper Substitutes" from STN Database Accession No. 128:218177 XP002150972 (Mar. 3, 1993).

* cited by examiner

WHITE, BIAXIALLY ORIENTED POLYESTER FILM WITH CYCLOOLEFIN COPOLYMER (COC), PROCESS FOR PRODUCING THE FILM, AND ITS USE

The present invention relates to a white, biaxially oriented polyester film which comprises at least one layer comprising a polyester and a cycloolefin copolymer (COC). The invention also relates to a process for producing the polyester film, and also to the use of the film.

BACKGROUND OF THE INVENTION

White, biaxially oriented polyester films are known in the prior art. These films known in the prior art are either easy to produce, have good optical properties or have acceptable processing performance.

DE-A 2 353 347 describes a process for producing a milky polyester film having one or more layers, which comprises preparing a mixture of particles of a linear polyester with from 3 to 27% by weight of a homopolymer or copolymer of ethylene or propylene, extruding the mixture as a film, quenching the film and biaxially orienting the same in directions running perpendicularly to one another, and heat-setting the film. A disadvantage of the process is that regenerated material produced during the production of the film (essentially a mixture of polyester and ethylene or propylene copolymer) cannot be reused without yellowing of the film. However, this makes the process uneconomical, and the film produced with regenerated material was not successful on the market. In addition, the film has roughness values which are significantly too high, giving it a very matte appearance (very low gloss) that is undesirable for many applications.

EP-A 0 300 060 describes a single-layer polyester film which comprises, besides polyethylene terephthalate, from 3 to 40% by weight of a crystalline propylene polymer and from 0.001 to 3% by weight of a surface-active substance. The effect of the surface-active substance is to increase the number of vacuoles in the film and at the same time to reduce their size to the extent desired. This achieves higher opacity and lower density of the film. A disadvantage of the film continues to be that regenerated material produced during the production of the film (essentially a mixture of polyester and propylene homopolymer) cannot be reused without yellowing of the film. However, this makes the process uneconomical, and the film produced with regenerated material was not successful on the market. In addition, the film has roughness values which are significantly too high, giving it a very matte appearance (very low gloss) that is undesirable for many applications.

EP-A 0 360 201 describes a polyester film having at least two layers, comprising a base layer with fine vacuoles, the density of which is from 0.4 to 1.3 kg/dm³, and at least one outer layer, the density of which is greater than 1.3 kg/dm³. The vacuoles are achieved by adding from 4 to 30% by weight of a crystalline propylene polymer, followed by biaxial stretching of the film. As a result of adding the outer layer the ease of production of the film is improved (no streaking on the film surface), the surface tension is increased and the roughness of the laminated surface can be reduced. A disadvantage still present is that regenerated material produced during the production of the film (essentially a mixture of polyester and propylene homopolymer) cannot be reused without yellowing of the film. However, this makes the process uneconomic, and the film produced with regenerated material was not successful on the market. In addition, the film listed in the examples continues to have excessive roughness values, giving it a matte appearance (low gloss) that is undesirable for many applications.

EP-A 0 795 399 describes a polyester film having at least two layers and comprising a base layer with fine vacuoles, the density of which is from 0.4 to 1.3 kg/dm³, and having at least one outer layer, the density of which is greater than 1.3 kg/dm³. The vacuoles are achieved by adding from 5 to 45% by weight of a thermoplastic polymer to the polyester in the base, followed by biaxial stretching of the film. The thermoplastic polymers used are, inter alia, polypropylene, polyethylene, polymethylpentene, polystyrene or polycarbonate, and the preferred thermoplastic polymer is polypropylene. As a result of adding the outer layer the ease of production of the film is improved (no streaking on the film surface), the surface tension is increased and the roughness of the laminated surface can be matched to prevailing requirements. Further modification of the film in the base layer and/or in the outer layers, using white pigments (generally $TiO_2$) and/or using optical brighteners permits the properties of the film to be matched to the prevailing requirements of the application. A continuing disadvantage is that regenerated material produced during the production of the film (essentially a mixture of polyester and the added polymer) cannot be reused without undefined and undesirable changes in the color of the film. This makes the process uneconomical, and the film produced with regenerated material was not successful on the market. In addition, the films listed in the examples continue to have excessive roughness values, giving it a matte appearance (low gloss) that is undesirable for many applications.

DE-A 195 40 277 describes a polyester film having one or more layers, which comprises a base layer with fine vacuoles, the density of which is from 0.6 to 1.3 kg/dm³, and which has a planar birefringence of from –0.02 to 0.04. The vacuoles are achieved by adding from 3 to 40% by weight of a thermoplastic resin to the polyester in the base, followed by biaxial stretching of the film. The thermoplastic resins used are, inter alia, polypropylene, polyethylene, polymethylpentene, cyclic olefin polymers, polyacrylic resins, polystyrene or polycarbonate, and preferred polymers are polypropylene and polystyrene. Maintaining the stated limits for the birefringence of the film gives the claimed film in particular a superior tear strength and superior isotropic properties. A continuing disadvantage is that regenerated material produced during the production of the film cannot be reused without undefined and undesirable changes in the color of the film. This makes the process uneconomical, and the film produced with regenerated material was not successful on the market. In addition, the films listed in the examples continue to have excessive roughness values, giving it a matte appearance (low gloss) that is undesirable for many applications.

EP-A 0 300 060, EP-A 0 360 201, EP-A 0 795 399, and DE-A 195 40 277 are incorporated by reference for their teaching with respect to the initiation of vacuoles in film layers.

DESCRIPTION OF THE INVENTION

The object of the present invention was to provide a white, biaxially oriented polyester film which has high gloss, and in particular is easier to produce, i.e. has lower production costs. In particular it should be ensured that the regenerated material produced directly during the production process can be reused at a concentration of from about 10 to 70% by weight, based on the total weight of the film, without any significant negative effect on the physical properties of the film. In particular, adding regenerated material should not give any significant yellowing of the film.

The object has been achieved by means of a white, biaxially oriented polyester film having at least a base layer, the characterizing features of which are that at least this base layer additionally comprises a cycloolefin copolymer (COC) at a concentration from about 4 to 60% by weight, based on the base layer, where the glass transition temperature of the cycloolefin copolymer (COC) is in the range from about 70 to 270° C.

For the purposes of the present invention, a white, biaxially oriented polyester film is a film of this type which has a whiteness above about 70%, preferably above about 75%, particularly preferably above about 80%. The opacity of the novel film is moreover above about 55%, preferably above about 60% and particularly preferably above about 65%.

To achieve the desired whiteness of the novel film the proportion of the cycloolefin copolymer (COC) in the base layer must be greater than about 4%, otherwise the whiteness is below about 70%. If, on the other hand, the cycloolefin copolymer (COC) content is greater than about 60%, the production of the film becomes uneconomic, since the orientation process becomes unreliable.

It is also necessary for the glass transition temperature of the cycloolefin copolymer (COC) used to be above about 70° C. If this is not the case (if the glass transition temperature is below about 70° C.) the polymer mixture is difficult to process (difficult to extrude), the desired whiteness is no longer achieved and the regenerated material used gives a film with a tendency toward increased yellowing. If, on the other hand, the glass transition temperature of the selected cycloolefin copolymer (COC) is above about 270° C., the polymer mixture will no longer be capable of sufficiently homogeneous dispersion in the extruder. The result is a film with non-uniform properties.

In the preferred embodiment of the novel film the glass transition temperature of the COCs used is in the range from about 90 to 250° C., and in the particularly preferred embodiment it is in the range from about 110 to 220° C.

Surprisingly, it has been found that adding a cycloolefin copolymer (COC) in the manner described above can produce a white, opaque and glossy film.

The whiteness and the opacity of the film can be precisely controlled and matched to the prevailing requirements as a function of the amount and type of the cycloolefin copolymer (COC) added. It is possible by this means to dispense to a considerable extent with the use of other whiteners and opacifiers. It was also highly surprising that the surface roughness of the film is significantly lower, and therefore the gloss of the film is significantly higher, than in comparable films of the prior art. The additional effect—that the regenerated material, unlike the polymeric additives of the prior art, shows no tendency to cause yellowing—was entirely surprising.

None of these features described was foreseeable, especially since although it is clear that COCs are substantially incompatible with polyethylene terephthalate, it is known that they are oriented with similar stretching ratios and stretching temperatures to those used for polyethylene terephthalate. In these circumstances the skilled worker would have expected that a white and opaque film with a high gloss cannot be produced under these process conditions.

In the preferred and particularly preferred embodiments the novel film has high and, respectively, particularly high whiteness and high and, respectively, particularly high opacity, and the change in color of the film as a result of adding regenerated material remains extremely small.

The novel film has one or more layers. The structure of single-layer embodiments is as for the COC-containing layer described below. Embodiments having more than one layer have at least two layers and always comprise the COC-containing layer and at least one other layer, where the COC-containing layer is the base layer, but may additionally also form the intermediate layer or the outer layer of the film having more than one layer. In a preferred embodiment the COC-containing layer forms the base layer of the film with at least one outer layer and preferably with outer layers on both sides, and (an) intermediate layer(s) may, if desired, be present on one or both sides. In another preferred embodiment the COC-containing layer also forms an intermediate layer of the film having more than one layer. Other embodiments with COC-containing intermediate layers have a five-layer structure and have COC-containing intermediate layers on both sides, besides the COC-containing base layer. In another embodiment the COC-containing layer may form (an) outer layer(s) on one or both sides of the base layer or intermediate layer, additionally to the base layer. For the purposes of the present invention, the base layer is that layer which makes up from more than about 50 to 100%, preferably from about 70 to 90%, of the total film thickness. The outer layer is the layer which forms the outermost layer of the film.

Each embodiment of the invention is a non-transparent, opaque film. For the purposes of the present invention, non-transparent films are films whose light transmittance as measured by ASTM-D 1003-77 is less than about 95%, preferably less than about 75%.

The COC-containing layer (the base layer) of the novel film comprises a polyester, preferably a polyester homopolymer, a COC, and also, if desired, other additives, in each case in effective amounts. This layer generally comprises at least about 20% by weight, preferably from about 40 to 96% by weight, in particular from about 70 to 96% by weight, of polyester, based on the weight of the layer.

The base layer of the film comprises a thermoplastic polyester. Polyesters suitable here are those made from ethylene glycol and terephthalic acid (e.g., polyethylene terephthalate, PET), from ethylene glycol and naphthalene-2,6-dicarboxylic acid (e.g., polyethylene 2,6- naphthalate, PEN), from 1,4-bishydroxymethylcyclo-hexane and terephthalic acid (e.g., poly-1,4-cyclohexanedimethylene terephthalate, PCDT) or else made from ethylene glycol, naphthalene-2,6-dicarboxylic acid and biphenyl4,4'-dicarboxylic acid (e.g., polyethyl-ene 2,6-naphthalate bibenzoate, PENBB). Particular preference is given to polyesters which are composed of at least 90 mol %, preferably at least 95 mol %, of ethylene glycol units and terephthalic acid units or ethylene glycol units and naphthalene-2,6-dicarboxylic acid units. The remaining monomer units are derived from other aliphatic, cycloaliphatic or aromatic diols and, respectively, dicarboxylic acids, as may also be present in layer A (A=outer layer 1) or in layer C (C=outer layer 2) of a multilayered ABC (B=base layer) film.

Examples of suitable aliphatic diols are diethylene glycol, triethylene glycol, aliphatic glycols of the formula HO—$(CH_2)_n$—OH, where n is an integer from 3 to 6 (in particular 1,3-propanediol, 1,4-butanediol, 1,5-pentanediol and 1,6-hexanediol) or branched aliphatic glycols having up to 6 carbon atoms. Among the cycloaliphatic diols, mention should be made of cyclohexanediols (in particular 1,4-cyclohex-anediol). Other suitable aromatic diols are those, for example, of the formula HO—$C_6H_4$—X—$C_6H_4$—OH where X is —$CH_2$—, —$C(CH_3)_2$—, —$C(CF_3)_2$—, —O—, —S— or —$SO2$—. Bisphenols of the formula HO—$C_6H_4$—$C_6H_4$—OH are also highly suitable.

Preferred aromatic dicarboxylic acids are benzenedicarboxylic acids, naphthalenedicarboxylic acids (such as naphthalene-1,4- or -1,6-dicarboxylic acid), biphenyl-x,x'-dicarboxylic acids (in particular biphenyl -4,4'-dicarboxylic acid), diphenylacetylene-x,x'-dicarboxylic acids (in particular diphenylacetylene-4,4'-dicarboxylic acid) and stilbene-x,x'-dicarboxylic acids. Among the cycloaliphatic dicarboxylic acids mention should be made of cyclohexanedicarboxylic acids (in particular cyclohexane-1,4-dicarboxylic acid). Among the aliphatic dicarboxylic acids the ($C_3$-$C_{19}$)-alkanedioic acids are particularly suitable, where the alkane moiety may be straight-chain or branched.

The polyesters may, for example, be prepared by the transesterification process. The starting materials here are dicarboxylic esters and diols, and these are reacted using the usual transesterification catalysts, such as salts of zinc, calcium, lithium, magnesium or manganese. The intermediates are then polycondensed in the presence of typical polycondensation catalysts, such as antimony trioxide or titanium salts. They may equally well be prepared by the direct esterification process in the presence of polycondensation catalysts, starting directly from the dicarboxylic acids and the diols.

According to the invention the COC-containing layer or, in the case of single-layer embodiments, the film, comprises an amount of not less than about 4.0% by weight, preferably from about 5 to 50% by weight and particularly preferably about 6 to 40% by weight, of a cycloolefin copolymer (COC), based on the weight of the layer or, in the case of single-layer embodiments, based on the weight of the film. It is significant for the present invention that the cycloolefin copolymer (COC) is not compatible with polyethylene terephthalate and does not form a homogeneous mixture with the same.

Cycloolefin polymers are homopolymers or copolymers, which contain polymerized cycloolefin units and, if desired, acyclic olefins as comonomers. Cycloolefin polymers suitable for the present invention contain from about 0.1 to 100% by weight, preferably from about 10 to 99% by weight, particularly preferably from about 50 to 95% by weight, of polymerized cycloolefin units in each case based on the total weight of the cycloolefin polymer. Particular preference is given to polymers which have been built up using the monomers comprising the cyclic olefins of the formulae I, II, III, IV, V or VI:

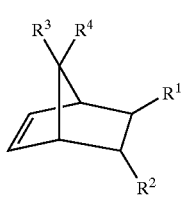

(I)

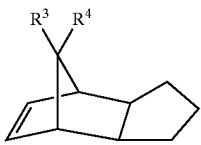

(II)

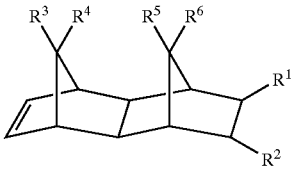

(III)

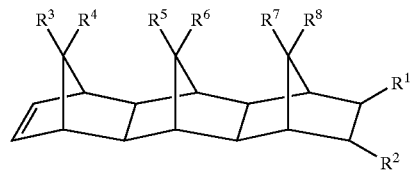

(IV)

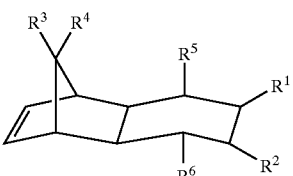

(V)

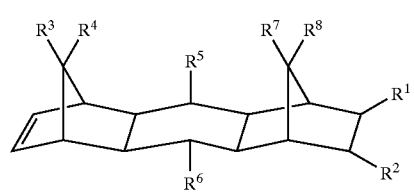

(VI)

$R^1$, $R^2$, $R^3$, $R^4$, $R^5$, $R^6$, $R^7$ and $R^8$ in these formulae may be identical or different and may be a hydrogen atom or a $C_1$–$C_{30}$-hydrocarbon radical, or two or more of the radicals $R^1$ to $R^8$ may be bonded cyclically, and the same radicals in the different formulae may have the same or different meaning. Examples of $C_1$–$C_{30}$-hydrocarbon radicals are linear or branched $C_1$–$C_8$-alkyl radicals, $C_6$–$C_{18}$-aryl radicals, $C_7$–$C_{20}$-alkylenearyl radicals and cyclic $C_3$–$C_{20}$-alkyl radicals and acyclic $C_2$–$C_{20}$-alkenyl radicals.

If desired, the cycloolefin polymers may contain from 0 to 45% by weight, based on the total weight of the cycloolefin polymer, of polymerized units of at least one monocyclic olefin of the formula VII:

(VII)

wherein n is a number from 2 to 10.

If desired, the cycloolefin polymers may contain from 0 to 99% by weight, based on the total weight of the cycloolefin polymer, of polymerized units of an acyclic olefin of the formula VIII:

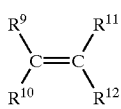
(VIII)

$R^9$, $R^{10}$, $R^{12}$ and R here may be identical or different and may be a hydrogen atom or a $C_1$–$C_{10}$-hydrocarbon radical, e.g. a $C_1$–$C_8$-alkyl radical or a $C_6$–$C_{14}$-alkyl radical.

Other polymers suitable in principle are cycloolefin polymers, which are obtained by ring-opening polymerization of at least one of the monomers of the formulae I to VI, followed by hydrogenation.

Cycloolefin homopolymers have a structure composed of one monomer of the formulae I to VI. These cycloolefin polymers are less suitable for the purposes of the present invention. Polymers suitable for the purposes of the present invention are cycloolefin copolymers (COC) which comprise at least one cycloolefin of the formulae I to VI and at least one acyclic olefins of the formula VIII as comonomers. These cycloolefin copolymers (COC), which can be used according to the invention, are termed COCs above and below. Acyclic olefins preferred here are those which have from 2 to 20 carbon atoms, in particular unbranched acyclic olefins having from 2 to 10 carbon atoms, for example ethylene, propylene and/or butylene. The proportion of polymerized units of acyclic olefins of the formula VIII is up to 99% by weight, preferably from about 5 to 80% by weight, particularly preferably from about 10 to 60% by weight, based on the total weight of the respective cycloolefin copolymer.

Among the cycloolefin copolymers described above those which are particularly preferred contain polymerized units of polycyclic olefins having a fundamental nor-bornene structure, particularly preferably norbornene or tetracyclododecene. Particular preference is also given to cycloolefin copolymers (COCs) which contain polymerized units of acyclic olefins, in particular ethylene. Particular preference is, again, given to norbornene-ethylene copolymers and tetracyclododecene-ethylene copolymers which in each case contain from about 5 to 80%, preferably from about 10 to 60% by weight of acrylic olefin (based on the weight of the copolymer). Particularly suitable cycloolefin copolymers (COC) are polynorborene, polydimethyloctahydronaphthalene, polycyclopentene, and poly (5-methyl) norborene.

The cycloolefin polymers generically described above generally have glass transition temperatures of from −20 to 400° C. Cycloolefin copolymers (COCs) which can be used for the invention have a glass transition temperature above about 70° C., preferably above about 90° C. and in particular above about 110° C. The viscosity number (decalin, 135° C., DIN 53 728) is advantageously from about 0.1 to 200 ml/g, preferably from about 50 to 150 ml/g.

The cycloolefin copolymers (COCs) are prepared by heterogeneous or homogeneous catalysis with organometallic compounds, as described in a wide variety of documents. Suitable catalyst systems based on mixed catalysts made from titanium compounds and, respectively, vanadium compounds in conjunction with aluminum organyl compounds are described in DD 109 224, DD 237 070 and EP-A-0 156 464. EP-A-0 283 164, EP-A-0 407 870, EP-A-0 485 893 and EP-A-0 503 422 describe the preparation of cycloolefin copolymers (COCs) with catalysts based on soluble metallocene complexes. The preparation processes described in the abovementioned specifications for cycloolefin polymers are expressly incorporated herein by way of reference.

The cycloolefin copolymers are incorporated into the film either in the form of pure granules or in the form of granulated concentrate (masterbatch), by premixing the polyester granules or polyester powder with the cycloolefin copolymer (COC) or, respectively, with the cycloolefin copolymer (COC) masterbatch, followed by feeding to an extruder. In the extruder the mixing of the components continues and they are heated to the processing temperature. It is advantageous here for the novel process if the extrusion temperature is above the glass transition temperature $T_g$ of the cycloolefin copolymer (COC), generally above the glass transition temperature of the cycloolefin copolymer (COC) by at least about 5° C., preferably by from about 10 to 180° C., in particular by from about 15 to 150° C.

For the intermediate layers and for the outer layers it is possible in principle to use the polymers used for the base layer. Besides these, other materials may also be present in the outer layers. The outer layers are then preferably composed of a mixture of polymers, of a copolymer or of a homopolymer, which comprise ethylene 2,6-naphthalate units and ethylene tere-phthalate units. Up to about 30 mol % of the polymers may be composed of other comonomers (e.g. ethylene isophthalate units).

The base layer and the other layers may additionally comprise conventional additives, such as stabilizers, antiblocking agents and other fillers. They are advantageously added to the polymer or, respectively, to the polymer mixture straightaway prior to melting. Examples of stabilizers used are phosphorus compounds, such as phosphoric acid or phosphoric esters.

Typical antiblocking agents (in this context also termed pigments) are inorganic and/or organic particles, such as calcium carbonate, amorphous silica, talc, magnesium carbonate, barium carbonate, calcium sulfate, barium sulfate, lithium phosphate, calcium phosphate, magnesium phosphate, aluminum oxide, lithium fluoride, the calcium, barium, zinc or manganese salts of the dicarboxylic acids used, carbon black, titanium dioxide, kaolin or crosslinked polymer particles, e.g. polystyrene particles or acrylate particles.

The additives selected may also comprise mixtures of two or more different antiblocking agents or mixtures of antiblocking agents of the same composition but different particle sizes. The particles may be added to the polymers of the individual layers of the film in the respective advantageous concentrations, e.g. as a glycolic dispersion during the polycondensation or via masterbatches during extrusion. Pigment concentrations which have proven particularly suitable are from about 0 to 25% by weight (based on the weight of the respective layer). More preferably, the concentrations of pigments, when used, are about 0.5 to 25% by weight (based on the weight of the respective layer). EP-A-0 602 964, for example, describes the antiblocking agents in detail.

To improve the whiteness of the film the base layer or the other additional layers may comprise further pigmentation, which are also known as white fillers. It has proven particularly advantageous here for the additional materials added to be barium sulfate with a particle size of from about 0.3 to 0.8 $\mu$m, preferably from about 0.4 to 0.7 $\mu$m, or titanium dioxide with a particle size of from about 0.05 to 0.3 $\mu$m. This gives the film a brilliant white appearance. The concentration of barium sulfate particles is from about 1 to 25% by weight, preferably from more than about 1 to 20% by weight, and very preferably from about 1 to 15% by weight.

The total thickness of the film may vary within wide limits and depends on the application envisaged. The preferred embodiments of the novel film have total thicknesses of from about 4 to 400 μm, preferably from about 8 to 300 μm, particularly preferably from about 10 to 300 μm. The thickness of any intermediate layer(s) present is/are, in each case independently of one another, from about 0.5 to 15 μm, preferably from about 1 to 10 μm, in particular from about 1 to 8 μm. All the values given are based on one intermediate layer. The thickness of the outer layer(s) is selected independently of the other layers and is preferably within the range from about 0.1 to 10 μm, in particular from about 0.2 to 5 μm, preferably from about 0.3 to 2 μm, and outer layers applied on both sides may be identical or different in terms of their thicknesses and compositions. The thickness of the base layer is therefore given by the difference between the total thickness of the film and the thickness of the outer and intermediate layer(s) applied, and, similarly to the total thickness, may therefore vary within wide limits.

The invention also provides a process for producing the novel polyester film by the extrusion or coextrusion process known per se.

For the purposes of the present invention the procedure is to extrude/coextrude, through a flat-film die, the melt(s) corresponding to the single-layer film or to the individual layers of the film, to draw off the resultant film on one or more roll(s) to solidify the film, then to stretch (orient) the film biaxially, to heat-set the biaxially stretched film, and, if desired, to corona- or flame-treat the surface layer intended for treatment.

The biaxial orientation procedure is generally carried out in sequence. For this, longitudinal orientation (i.e. in the machine direction=MD) is preferably the first procedure, followed by transverse orientation (i.e. perpendicularly to the machine direction=TD). This gives an orientation of the molecular chains. The longitudinal orientation procedure preferably takes place with the aid of two rolls running at different speeds corresponding to the stretching ratio desired. For the transverse stretching procedure an appropriate tenter frame is generally utilized.

The use of simultaneous orientation procedures for the novel film in both directions (MD and TD) with the aid of a suitable tenter frame has not proven useful. Specifically, this stretching gives a film which has insufficient whiteness and insufficient opacity.

The temperature at which the orientation procedure is carried out may vary within a relatively large range and depends on the film properties desired. The longitudinal stretching is generally carried out at from about 80 to 130° C. and the transverse stretching at from about 90 to 150° C. The longitudinal stretching ratio is generally within the range from about 2.5:1 to 6:1, preferably from about 3:1 to 5.5:1. The transverse stretching ratio is generally within the range from about 3.0:1 to 5.0:1, preferably from about 3.5:1 to 4.5:1.

In the heat-setting which follows, the film is held at a temperature of from about 150 to 250° C. for from about 0.1 to 10 s. The film is then wound up in the usual manner.

To establish other desired properties, the film may be chemically treated or else corona- or, respectively, flame-treated. The intensity of treatment is selected such that the surface tension of the film is generally above about 45 mN/m.

To establish other properties, the film may also be coated. Typical coatings have adhesion-promoting, antistatic, slip-improving or release action. It is clear that these additional coatings may be applied to the film by in-line coating using aqueous dispersions, prior to the transverse stretching procedure.

The particular advantage of the novel film is its high whiteness and high opacity. Surprisingly, the gloss of the film was also very high. The whiteness of the film is above about 70%, preferably above about 75% and particularly preferably about 80%. The opacity of the novel film is above about 55%, preferably above about 60% and particularly preferably above about 65%. The gloss of the novel film is above about 80, preferably above about 90 and particularly preferably above about 100.

Another particular advantage of the invention is that regenerated material produced directly during the production process can be reused at a concentration of from about 10 to 70% by weight, based on the total weight of the film, without any significant negative effect on the physical properties of the film. In particular, the regenerated material (composed essentially of polyester and cycloolefin copolymers (COC)) does not give undefined changes in the color of the film, as is the case of the films of the prior art.

A further advantage of the invention is that the production costs of the novel film are comparable with those of conventional transparent films of the prior art. The other properties of the novel film relevant to its processing and use remain essentially unchanged or are even improved.

The film has excellent suitability for packing foods or other consumable items which are sensitive to light and/or to air. It is also highly suitable for use in the industrial sector, e.g. for producing hot-stamping foils or as a label film. Besides this, the film is, of course, particularly suitable for image-recording papers, printed sheets, magnetic recording cards, to name just a few possible applications.

The processing performance and winding performance of the film, in particular on high-speed machines (winders, metallizers, printing machines and laminating machines) is exceptionally good. A measure of processing performance is the coefficient of friction of the film, which is below about 0.6. A decisive factor affecting winding performance, besides a good thickness profile, excellent layflat and a low coefficient of friction, is the roughness of the film. It has become apparent that the winding of the novel film is particularly good if the average roughness is within a range from about 50 to 250 nm while the other properties are complied with. The roughness may be varied within the stated range by, inter alia, varying the COC concentration and the process parameters in the production process. The table below (Table 1) summarizes the most important film properties according to the invention.

TABLE 1

|  | Range according to the invention | Preferred | Particularly preferred | Unit | Test method |
|---|---|---|---|---|---|
| Composition |  |  |  |  |  |
| Concentration of cycloolefin copolymer (COC) in base layer | 4–60 | 5–50 | 6–40 | % |  |
| Glass transition temperatures of cycloolefin copolymer (COC) | 70–270 | 90–250 | 110–220 | ° C. | DIN 73 765 |
| Film properties |  |  |  |  |  |
| Whiteness | >70 | >75 | >80 | % | Berger |
| Opacity | >55 | >60 | >65 | % | DIN 53 146 |
| Coefficient | <0.6 | <0.55 | <0.5 |  | DIN 53 375 |

TABLE 1-continued

| | Range according to the invention | Preferred | Particularly preferred | Unit | Test method |
|---|---|---|---|---|---|
| of Friction, COF | | | | | |
| Gloss | >80 | >90 | >100 | | DIN 67 530 |
| Average roughness, $R_a$ | 50–250 | 60–230 | 70–200 | nm | DIN 4768, cut-off of 0.25 mm |

The following parameters were used to describe the polymers and the films:
SV (Solution Viscosity)

To determine the SV, a specimen of polyester was dissolved in a solvent (dichloroacetic acid). The viscosity of this solution, and also the viscosity of the pure solvent, are measured in an Ubbelohde viscometer. The quotient is calculated from the two values, 1.000 is deducted from this and the resultant value multiplied by 1000. This gives the SV (solution viscosity).

Coefficient of Friction

The coefficient of friction, COF, is determined according to DIN 53 375. The coefficient of sliding friction was measured 14 days after production of the film.

Surface Tension

The surface tension was determined by the ink method (DIN 53 364).

Roughness

The roughness, $R_a$, of the film was determined according to DIN 4768 with a cut-off of 0.25 mm.

Whiteness and Opacity

The whiteness and opacity were determined with the aid of a Zeiss, Oberkochem (DE) "ELREPHO" reflectance photometer, standard illuminant C, 2° C. normal observer. Opacity is determined according to DIN 53 146. Whiteness is defined as W=RY+3RZ−3RX, wherein W=whiteness and RY, RZ and RX=relevant reflection factors when the Y, Z and X color-measurement filter is used. The white standard used was a barium sulfate pressing (DIN 5033, Part 9). A detailed description is given, for example, in Hansl Loos "Farbmessung", Verlag Beruf und Schule, Itzehoe (1989).

Light Transmittance

Light transmittance is measured using a method based on ASTM-D 1033-77.

Gloss

Gloss was determined according to DIN 67 530. The reflectance was measured as an optical value characteristic of a film surface. Based on the standards, ASTM-D 523-78 and ISO 2813, the angle of incidence was set at 60°. A beam of light hits the flat test surface at the set angle of incidence and is reflected and/or scattered by this surface. A proportional electrical variable is displayed representing light beams hitting the photoelectronic detector. The value measured is dimensionless and must be stated together with the angle of incidence.

Glass Transition Temperature

The glass transition temperature, Tg, was determined using film specimens with the aid of DSC (differential scanning calorimetry) (DIN 73 765). A DuPont DSC 1090 was used. The heating rate was 20° K./min and the specimen weight was about 12 mg. The glass transition transition, Tg, was determined in the first heating procedure. Many of the specimens showed an enthalpy relaxation (a peak) at the beginning of the step-like glass transition. The temperature taken as Tg was that at which the step-like change in heat capacity—without reference to the peak-shaped enthalpy relaxation—achieved half of its height in the first heating procedure. In all cases, there was only a single glass transition observed in the thermogram in the first heating procedure.

EXAMPLE 1

Chips of polyethylene terephthalate (prepared by the transesterification process using a Mn transesterification catalyst, Mn concentration: 100 ppm) were dried at 150° C. to a residual moisture below 100 ppm and fed to the extruder for the base layer B. Alongside this, chips of ®Topas 6015 cycloolefin copolymer (COC) from Ticona (COC composed of 2-norbornene and ethylene, see also W. Hatke: Folien aus COC [COC Films], Kunststoffe 87 (1997) 1, pp. 58–62) with a glass transition temperature Tg of about 160° C. were also fed to the extruder for the base layer B. The proportional amount of the cycloolefin copolymer (COC) in the entire film was 10% by weight.

Extrusion followed by a stepwise orientation procedure in longitudinal and transverse directions was used to produce a white, opaque single-layer film with a total thickness of 23 μm.

Base layer B was a mixture of:

90.0% by weight of polyethylene terephthalate homopolymer with an SV of 800 and
10.0% by weight of Topas 6015 cycloolefin copolymer (COC) from Ticona The process conditions in the individual steps were:

| Extrusion: | Temperatures of base layer: | 280° C. |
|---|---|---|
| | Temperature of the take-off roll: | 30° C. |
| Longitudinal stretching: | Temperature: | 80–125° C. |
| | Longitudinal stretching ratio: | 4.2 |
| Transverse stretching | Temperature: | 80–135° C. |
| | Transverse stretching ratio: | 4.0 |
| Setting: | Temperature: | 230° C. |
| Duration: | | 3 s |

The film had the good properties required and the desired handling and processing performance. The properties achieved in films produced in this way are given in Table 2.

EXAMPLE 2

Unlike in Example 1, 50% by weight of regenerated material was now added to the base. The concentration of the cycloolefin copolymer (COC) in the film thus produced was again 10% by weight. The process parameters were unchanged from Example 1. A visual observation was made of any yellow discoloration of the film. Table 2 shows that hardly any yellow discoloration could be seen.

Base layer B was a mixture of:

45.0% by weight of polyethylene terephthalate homopolymer with an SV of 800,
50.0% by weight of regenerated material (90% by weight of polyester + 10% by weight of Topas 6015) and
5.0% by weight of Topas 6015 cycloolefin copolymer (COC) from Ticona

EXAMPLE 3

Unlike in Example 1, the film now produced had a thickness of 96 μm. The concentration of the cycloolefin copolymer (COC) in the film was 8% by weight. The process parameters were unchanged from Example 1. A visual observation was made of any yellow discoloration of the film. Table 2 shows that no yellow discoloration of the film could be seen.

Base layer B was a mixture of:

| | |
|---|---|
| 92.0% by weight | of polyethylene terephthalate homopolymer with an SV of 800 and |
| 8.0% by weight | of Topas 6015 cycloolefin copolymer (COC) from Ticona |

EXAMPLE 4

Unlike in Example 3, 50% by weight of regenerated material was now added to the base. The concentration of the cycloolefin copolymer (COC) in the film was again 8% by weight. The process parameters remained unchanged from Example 1. A visual observation was made of any yellow discoloration of the film. Table 2 shows that hardly any yellow discoloration could be seen.

Base layer B was a mixture of:

| | |
|---|---|
| 56.0% by weight | of polyethylene terephthalate homopolymer with an SV of 800 and |
| 50.0% by weight | of the regenerated material from the same process (90% by weight of polyester + 10% by weight of Topas 6015) and |
| 4.0% by weight | of Topas 6015 cycloolefin copolymer (COC) from Ticona |

COMPARATIVE EXAMPLE 1

Example 1 from DE-A 2 353 347 was repeated. The example was modified by additionally including 50% by weight of regenerated material in the process. Table 2 shows that a marked yellow discoloration of the film could be seen. In addition, the roughness of the film is much too high for many applications and its gloss is too low for many applications. This is very probably attributable to the use of other polymeric additives.

Base layer B was a mixture of:

| | |
|---|---|
| 47.5% by weight | of polyethylene terephthalate homopolymer with an SV of 800 and |
| 50.0% by weight | of regenerated material from the same process (95% by weight of polyester + 5% by weight of polypropylene) and |
| 2.5% by weight | of polypropylene |

COMPARATIVE EXAMPLE 2

Example 1 from EP-A 0 300 060 was repeated. The example was modified by additionally including 50% by weight of regenerated material in the process. Table 2 shows that a marked yellow discoloration of the film could be seen. In addition, the roughness of the film is much too high for many applications and its gloss is too low for many applications. This is very probably attributable to the use of other polymeric additives.

Base layer B was a mixture of:

| | |
|---|---|
| 45.0% by weight | of polyethylene terephthalate homopolymer with an SV of 800 and |
| 50.0% by weight | of regenerated material from the same process (95% by weight of polyester + 5% by weight of polypropylene) and |
| 5.0% by weight | of polypropylene |

COMPARATIVE EXAMPLE 3

Example 1 from EP-A 0 360 201 was repeated. The example was modified by additionally including 50% by weight of regenerated material in the process. Table 2 shows that a marked yellow discoloration of the film could be seen. In addition, the roughness of the film is much too high for many applications and its gloss is too low for many applications. This is very probably attributable to the use of other polymeric additives.

Base layer B was a mixture of:

| | |
|---|---|
| 40.0% by weight | of polyethylene terephthalate homopolymer with an SV of 800 and |
| 50.0% by weight | of regenerated material from the same process (95% by weight of polyester + 5% by weight of polypropylene) and |
| 10.0% by weight | of polypropylene |

COMPARATIVE EXAMPLE 4

Example 1 from DE-A 195 40 277 was repeated. The example was modified by additionally including 50% by weight of regenerated material in the process. Table 2 shows that a marked yellow discoloration of the film could be seen. In addition, the roughness of the film is much too high for many applications and its gloss is too low for many applications. This is very probably attributable to the use of other polymeric additives.

Base layer B was a mixture of:

| | |
|---|---|
| 43.5% by weight | of polyethylene terephthalate homopolymer with an SV of 800 and |
| 50.0% by weight | of regenerated material from the same process (95% by weight of polyester + 5% by weight of polystyrene) and |
| 6.5% by weight | of polystyrene |

TABLE 2

| Example | Film thickness μm | Layer structure | Added to polyester | Additive concentration in base layer % | Glass transition temperature of additive °C. | Whiteness % | Opacity % | Evaluation of film yellowness | Gloss | Coefficient of friction COF Side A against Side C | Average roughness $R_a$ nm Side A | Average roughness $R_a$ nm Side C |
|---|---|---|---|---|---|---|---|---|---|---|---|---|
| E 1 | 23 | B | COC | 10 | 170 | 75 | 75 | ++ | 115 | 0.52 | 120 | 120 |
| E 2 | 23 | B | COC | 10 | 170 | 76 | 80 | + | 120 | 0.50 | 110 | 110 |
| E 3 | 96 | B | COC | 8 | 170 | 85 | 85 | ++ | 125 | 0.42 | 100 | 100 |
| E 4 | 96 | B | COC | 8 | 170 | 86 | 90 | + | 130 | 0.35 | 98 | 98 |
| CE 1 | 155 | B | Polypropylene | 5 | −10 | 80 | 70 | − | 46 | 0.45 | 410 | 410 |
| CE 2 | 100 | B | Polypropylene | 10 | −10 | 88 | 80 | − | 57 | 0.45 | 180 | 180 |
| CE 3 | 100 | ABA | Polypropylene | 20 | −10 | 92 | 89 | − | 54 | 0.25 | 370 | 370 |
| CE 4 | 125 | B | Polystyrene | 13 | 100 | 82 | 82 | − | 51 | 0.35 | 480 | 480 |

Key to yellowness in films produced:
++ no yellowing detectable
+ slight yellow coloration detectable
− marked yellow coloration detectable

What is claimed is:

1. A white, biaxially oriented polyester film comprising at least a base layer and optionally one or more other layers, wherein at least the base layer comprises a polyester and a cycloolefin polymer,
   wherein the cycloolefin polymer is a norbornene-ethylene copolymer or a tetracyclododecene-ethylene copolymer, wherein the cycloolefin polymer is present at a concentration ranging from about 4 to about 60% by weight, based on this layer, where the glass transition temperature of the cycloolefin polymer is above 110° C.,
   wherein the film has a gloss of about 80 or above and an opacity of about 55% or above, contains from about 10% to about 70% recycled material, and is oriented using a transverse stretching ratio of from about 3.5:1 to about 4.5:1.

2. A polyester film according to claim 1, wherein the base layer comprises a cycloolefin polymer at a concentration ranging from about 5 to 50% by weight, based on this layer.

3. A polyester film according to claim 1, wherein the base layer comprises a cycloolefin polymer at a concentration ranging from about 6 to 40% by weight, based on this layer.

4. A polyester film according to claim 1, wherein the cycloolefin polymer has a glass transition temperature ranging up to 220° C.

5. A polyester film according to claim 1, wherein the film has a whiteness above about 70%.

6. A polyester film according to claim 1, wherein the film has a whiteness above about 75%.

7. A polyester film according to claim 1, wherein the film has a whiteness above about 80%.

8. A polyester film according to claim 1, wherein the film has an opacity above about 60%.

9. A polyester film according to claim 1, wherein the film has an opacity above about 65%.

10. A polyester film according to claim 1, wherein the film has a gloss above about 90.

11. A polyester film according to claim 1, wherein the film has a gloss above about 100.

12. A polyester film according to claim 1, wherein each layer comprises from about 0 to 25% by weight, based in each case on the weight of the layer, of anti-blocking agents, vacuole initiators, white fillers or mixtures thereof.

13. A polyester film according to claim 1, wherein at least one outer layer has been arranged on the cycloolefin polymer-containing base layer.

14. A polyester film according to claim 13, further comprising one or more intermediate layers, wherein an intermediate layer has been arranged between the cycloolefin polymer-containing base layer and an outer layer.

15. A polyester film according to claim 1, wherein the film is a single-layer film composed of the cycloolefin polymer-containing base layer.

16. A method for packaging foodstuffs and other consumable items, comprising packaging said foodstuffs and other consumable items in a by film as claimed in claim 1.

17. A method for recording information, comprising recording said information on a film as claimed in claim 1.

18. A process for producing a white, biaxially oriented polyester film according to claim 1, comprising the steps:
   (A) extruding a melt for each layer through a flat-film die;
   (B) drawing off the resultant film onto at least one roller;
   (C) biaxially stretching the resultant solidified film; and
   (D) heat setting the biaxially stretched film.

19. The process of claim 18, wherein the biaxially stretched film is chemical-, corona- or flame-treated.

20. The process of claim 18, wherein the biaxial stretching is conducted by first stretching the solidified film in the longitudinal direction and then by stretching in the transverse direction.

* * * * *